US012509339B2

(12) United States Patent
Miller et al.

(10) Patent No.: US 12,509,339 B2
(45) Date of Patent: Dec. 30, 2025

(54) TURNTABLE LEVELING SYSTEM FOR A MOBILE ELEVATING WORK PLATFORM

(71) Applicant: Oshkosh Corporation, Oshkosh, WI (US)

(72) Inventors: Wenton S. Miller, Oshkosh, WI (US); Eric Hackenberg, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 1037 days.

(21) Appl. No.: 17/563,719

(22) Filed: Dec. 28, 2021

(65) Prior Publication Data

US 2022/0204332 A1 Jun. 30, 2022

Related U.S. Application Data

(60) Provisional application No. 63/131,592, filed on Dec. 29, 2020.

(51) Int. Cl.
*B66F 11/04* (2006.01)

(52) U.S. Cl.
CPC .................................. *B66F 11/044* (2013.01)

(58) Field of Classification Search
CPC ..................................................... B66F 11/044
USPC ......................................................... 182/63.1
See application file for complete search history.

(56) References Cited

U.S. PATENT DOCUMENTS 4,326,571 A 4/1982 Crawford
4,638,887 A * 1/1987 Kishi .................... B66F 11/046 187/244
4,650,017 A 3/1987 Pelletier et al.
4,899,841 A 2/1990 Hawbaker et al.
5,337,847 A 8/1994 Woods et al.
6,105,699 A 8/2000 Hinds
6,135,225 A 10/2000 Barsic
6,173,973 B1 1/2001 Robinson
6,241,263 B1 6/2001 Hicks
6,343,799 B1 2/2002 Moyer
6,609,581 B2 8/2003 Vaile
7,753,382 B2 7/2010 Choi
7,832,740 B2 11/2010 Kim et al.
8,180,532 B2 5/2012 O'Halloran et al.
9,877,437 B2 1/2018 Neumann
9,890,024 B2 2/2018 Hao et al.
(Continued)

FOREIGN PATENT DOCUMENTS

CN 103463768 B 12/2013
CN 204434227 U 7/2015
(Continued)

*Primary Examiner* — Anita M King
(74) *Attorney, Agent, or Firm* — FOLEY & LARDNER LLP

(57) ABSTRACT

A mobile elevating work platform includes a chassis, a slew bearing, a turntable, a lift system, and a turntable leveling system. The turntable leveling system is positioned above the slew bearing and supports the lift system. The turntable leveling system includes a baseplate, a bracket, a first actuator, and a second actuator. The baseplate extends above the slew bearing. The bracket is rotatably coupled to the baseplate and is configured to tilt relative to the baseplate about an axis extending parallel with the baseplate. The first actuator is positioned on a first side of the bracket and the second actuator is positioned on a second side of the bracket.

20 Claims, 9 Drawing Sheets

(56) References Cited

U.S. PATENT DOCUMENTS

| | | | | |
|---|---|---|---|---|
| 10,048,158 | B2 | 8/2018 | Lawler et al. | |
| 11,492,239 | B2 * | 11/2022 | Shankar | B66F 3/44 |
| 11,572,262 | B2 * | 2/2023 | Kobel | B66F 17/006 |
| 11,597,640 | B2 * | 3/2023 | Boroni | G05B 15/02 |
| 11,691,859 | B2 * | 7/2023 | Yutzy | B66F 17/006<br>182/19 |
| 11,802,031 | B2 * | 10/2023 | Shankar | B66F 11/048 |
| 2019/0127194 | A1 * | 5/2019 | Hansen | E02F 3/96 |
| 2020/0139804 | A1 | 5/2020 | Holmes et al. | |
| 2020/0317480 | A1 * | 10/2020 | Shankar | B66F 11/044 |
| 2021/0039934 | A1 * | 2/2021 | Hackenberg | B66F 13/00 |
| 2021/0276423 | A1 * | 9/2021 | Lombardo | B25J 5/007 |
| 2022/0371864 | A1 * | 11/2022 | Shankar | B66F 3/44 |
| 2023/0416061 | A1 * | 12/2023 | Shankar | B66F 11/048 |

FOREIGN PATENT DOCUMENTS

| | | | |
|---|---|---|---|
| DE | 20 36 559 | A1 | 3/1972 |
| DE | 19653376.4 | A1 | 6/1998 |
| EP | 1 536 098 | A1 | 6/2005 |
| FR | 2188037 | A1 | 1/1974 |

* cited by examiner

TURNTABLE LEVELING SYSTEM FOR A MOBILE ELEVATING WORK PLATFORM

CROSS-REFERENCE TO RELATED APPLICATION

This application claims the benefit of U.S. Provisional Patent Application No. 63/131,592, filed Dec. 29, 2020, which is incorporated herein by reference in its entirety.

BACKGROUND

Boom lifts and other mobile elevating work platforms (MEWPs) are frequently used outdoors to accomplish tasks at different elevations. In some instances, the MEWPs will encounter an uneven ground surface, which may cause a chassis of the MEWP to lean about a roll axis of the MEWP. As the lean of the MEWP becomes more severe, the center of gravity on the MEWP shifts toward one of the wheels. An allowable working height of the platform on the MEWP decreases as the lean becomes more severe. The moment generated by the platform at a normal maximum working height may otherwise violate a necessary factor of safety for the balancing force of a counterweight on the MEWP. Accordingly, the uneven ground surface can prevent or restrict a traditional MEWP from performing tasks in certain locations or terrains.

SUMMARY

One exemplary embodiment relates to a mobile elevating work platform (e.g., a boom). The MEWP includes a chassis, a slew bearing, a turntable, a lift system, and a turntable leveling system. The chassis supports a plurality of wheels. The slew bearing is supported by the chassis. The turntable is positioned above the slew bearing and is configured to rotate about the slew bearing, relative to the chassis. The lift system is positioned on the turntable and is configured to rotate with the turntable relative to the chassis about the slew bearing. The turntable leveling system is positioned above the slew bearing and supports the lift system. The turntable leveling system includes a baseplate, a bracket, a first actuator, and a second actuator. In some examples, the turntable is the baseplate within the turntable leveling system. The baseplate extends above the slew bearing. The bracket is rotatably coupled to the baseplate and is configured to tilt relative to the baseplate about an axis extending parallel with the baseplate. The first actuator is positioned on a first side of the bracket and the second actuator is positioned on a second side of the bracket. Extension of the first actuator and retraction of the second actuator causes the bracket to rotate about the axis in a first direction. Retraction of the first actuator and retraction of the second actuator causes the bracket to rotate about the axis in a second direction opposite the first direction.

Another exemplary embodiment relates to a mobile elevating work platform (e.g., a boom). The MEWP includes a chassis, a slew bearing, a turntable, a lift system, and a turntable leveling system. The slew bearing is supported by the chassis. The turntable is positioned above the slew bearing and is configured to rotate about the slew bearing, relative to the chassis. The lift system is positioned on the turntable and is configured to rotate with the turntable relative to the chassis about the slew bearing. The turntable leveling system is positioned above the slew bearing and supports the lift system. The turntable leveling system includes a baseplate, a bracket, a first actuator, and a second actuator. The bracket defines an array of pivot points. The baseplate is coupled to the bracket and is configured to rotate about an axis defined by at least one of the array of pivot points. The first actuator is positioned on a first side of the bracket and the second actuator is positioned on a second side of the bracket. Each actuator is coupled to one of the array of pivot points. Extension of the first actuator and retraction of the second actuator causes the bracket to rotate about the axis in a first direction. Retraction of the first actuator and retraction of the second actuator causes the bracket to rotate about the axis in a second direction opposite the first direction.

Another exemplary embodiment relates to a mobile elevating work platform (e.g., a boom). The MEWP includes a chassis, a slew bearing, a turntable, a lift system, and a turntable leveling system. The chassis supports a plurality of wheels. The slew bearing is supported by the chassis. The turntable is positioned above the slew bearing and is configured to rotate about the slew bearing, relative to the chassis. The lift system is positioned on the turntable and is configured to rotate with the turntable relative to the chassis about the slew bearing. The turntable leveling system is positioned above the slew bearing and supports the lift system. The turntable leveling system includes a baseplate, a bracket, a first actuator, and a second actuator. The baseplate extends above the slew bearing and defines the turntable. The bracket is rotatably coupled to the baseplate and is configured to tilt relative to the baseplate about an axis extending parallel with the baseplate. The first actuator is positioned on a first side of the bracket and the second actuator is positioned on a second side of the bracket. The first actuator is coupled to a first side of a lower lift arm of the lift system. The second actuator is coupled to a second side of the lower lift arm of the lift system. Extension of the first actuator and retraction of the second actuator causes the bracket to rotate about the axis in a first direction. Retraction of the first actuator and retraction of the second actuator causes the bracket to rotate about the axis in a second direction opposite the first direction The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for leveling a turntable on a boom. The boom includes a turntable leveling system that is positioned above a slew bearing of the boom and that is configured to rotate a lowermost segment of a lift assembly relative to a base assembly of the boom to reduce tipping moments caused by uneven terrain. The turntable leveling system includes one or more actuators (e.g., hydraulic cylinders) that work in unison to adjust a tilt angle of the turntable relative to the base assembly. Adjusting the tilt angle of the turntable relative to the base assembly allows the boom to continue operating with the platform assembly at higher elevations as compared to conventional booms. By positioning the turntable leveling system above the slew bearing, a turntable motor and the turntable leveling system can effectively adjust the turntable in multiple directions using a cheaper and less complex mechanism formed from two opposing or offset actuators and the turntable motor.

Figure 1:
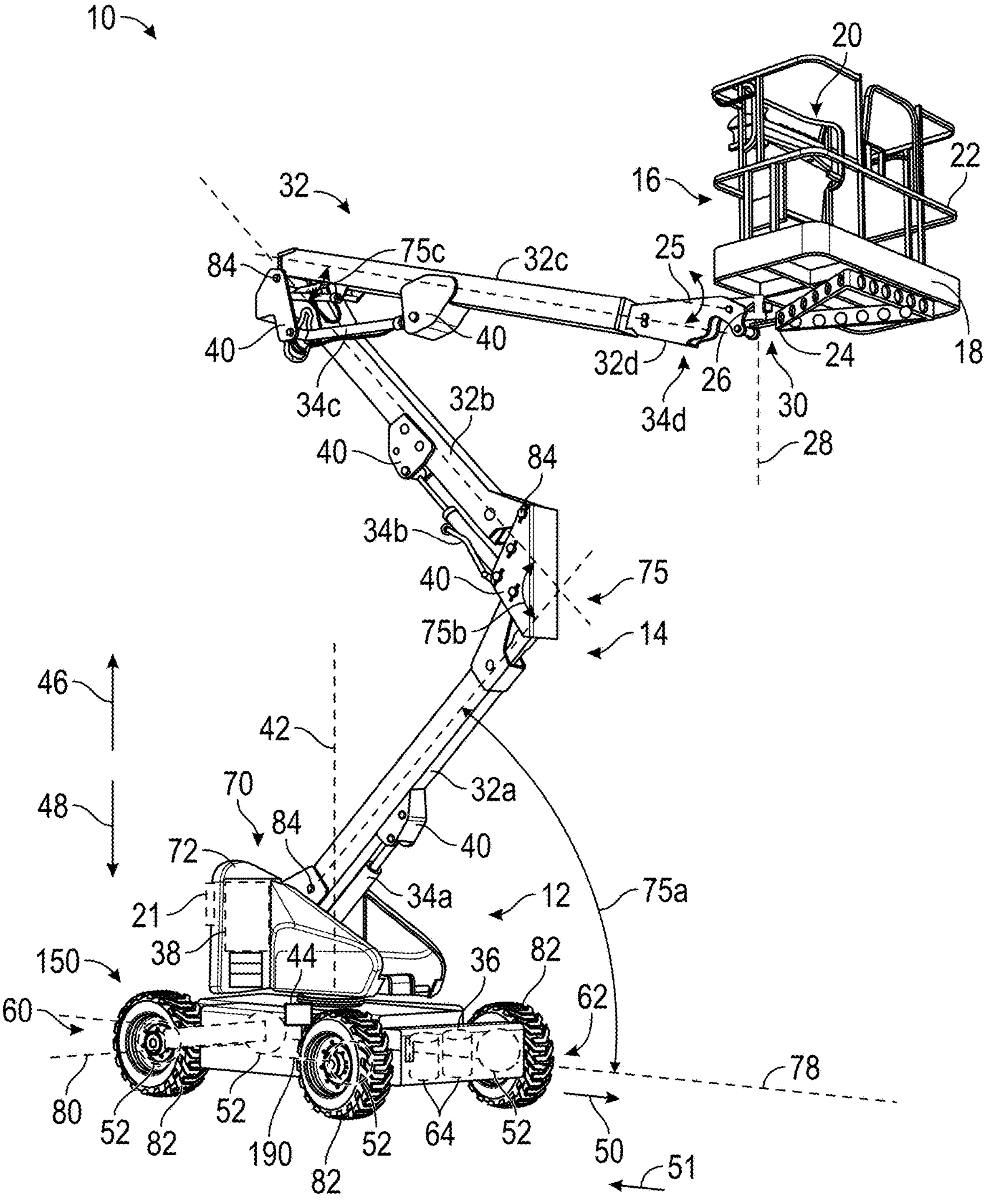
FIG. 1 is a front perspective view of a boom lift, according to an exemplary embodiment.

Referring to FIG. 1, a lifting apparatus, a telehandler, electric boom lift, a towable boom lift, a lift device, a fully electric boom lift, etc., shown as a boom 10 includes a base assembly 12 (e.g., a support assembly, a drivable support assembly, a support structure, a chassis, etc.), a platform assembly 16 (e.g., a platform, a terrace, etc.), and a lift assembly 14 (e.g., a boom lift assembly, a lifting apparatus, an articulated arm, a scissors lift, etc.). The boom 10 includes a front end (e.g., a forward facing end, a front portion, a front, etc.), shown as front 62, and a rear end (e.g., a rearward facing end, a back portion, a back, a rear, etc.,) shown as rear 60. The lift assembly 14 is configured to elevate the platform assembly 16 in an upwards direction 46 relative to the base assembly 12. The lift assembly 14 is also configured to translate the platform assembly 16 in a downwards direction 48. The lift assembly 14 is also configured to translate platform assembly 16 in either a forwards direction 50 or a rearwards direction 51. The lift assembly 14 generally facilitates performing a lifting function to raise and lower the platform assembly 16, as well as movement of the platform assembly 16 in various directions.

The base assembly 12 defines a longitudinal axis 78 and a lateral axis 80. The longitudinal axis 78 define the forward direction 50 of boom 10 and the rearward direction 51. The boom 10 is configured to translate in the forward direction 50 and to translate backwards in the rearward direction 51. The base assembly 12 includes one or more wheels, tires, wheel assemblies, tractive elements, rotary elements, treads, etc., shown as tractive elements 82. The tractive elements 82 are configured to rotate to drive (e.g., translate, steer, move, etc.) the boom 10. The tractive elements 82 can each include an electric motor 52 (e.g., electric wheel motors) configured to drive the tractive elements 82 (e.g., to rotate tractive elements 82 to facilitation motion of the boom 10). In other embodiments, the tractive elements 82 are configured to receive power (e.g., rotational mechanical energy) from electric motors 52 or through a drive train (e.g., a combination of any number and configuration of a shaft, an axle, a gear reduction, a gear train, a transmission, etc.). In some embodiments, one or more tractive elements 82 are driven by a prime mover through a transmission. The tractive elements 82 and electric motors 52 (or prime mover) can facilitate a driving and/or steering function of the boom 10.

The platform assembly 16 is configured to provide a work area for an operator of the boom 10 to stand/rest upon. The platform assembly 16 can be pivotally coupled to an upper end of the lift assembly 14. The boom 10 is configured to facilitate the operator accessing various elevated areas (e.g., lights, platforms, the sides of buildings, building scaffolding, trees, power lines, etc.). The boom 10 uses various electrically powered motors and electrically powered linear actuators or hydraulic cylinders to facilitate elevation of the platform assembly 16 (e.g., relative to the base assembly 12, or to a ground surface that the base assembly 12 rests upon).

The platform assembly 16 includes a base member, a base portion, a platform, a standing surface, a shelf, a work platform, a floor, a deck, etc., shown as a deck 18. The deck 18 provides a space (e.g., a floor surface) for a worker to stand upon as platform assembly 16 is raised and lowered.

The platform assembly 16 includes various members, beams, bars, guard rails, rails, railings, etc., shown as rails 22. The rails 22 extend along substantially an entire perimeter of the deck 18. The rails 22 provide one or more members for the operator of the boom 10 to grasp while using the boom 10 (e.g., to grasp while operating the boom 10 to elevate the platform assembly 16). The rails 22 can include members that are substantially horizontal to the deck 18. The rails 22 can also include vertical structural members that couple with the substantially horizontal members. The vertical structural members can extend upwards from the deck 18.

The platform assembly 16 can include a human machine interface (HMI) (e.g., a user interface), shown as the HMI 20. The HMI 20 is configured to receive user inputs from the operator at or upon the platform assembly 16 to facilitate operation of the boom 10. The HMI 20 can include any number of buttons, levers, switches, keys, etc., or any other user input device configured to receive a user input to operate the boom 10. The HMI 20 can be supported by one or more of the rails 22.

The platform assembly 16 includes a frame 24 (e.g., structural members, support beams, a body, a structure, etc.) that extends at least partially below the deck 18. The frame 24 can be integrally formed with the deck 18. The frame 24 is configured to provide structural support for the deck 18 of the platform assembly 16. The frame 24 can include any number of structural members (e.g., beams, bars, I-beams, etc.) to support the deck 18. The frame 24 couples the platform assembly 16 with the lift assembly 14. The frame 24 may be rotatably or pivotally coupled with the lift assembly 14 to facilitate rotation of the platform assembly 16 about an axis 28 (e.g., a centerline). The frame 24 can also rotatably/pivotally couple with the lift assembly 14 such that the frame 24 and the platform assembly 16 can pivot about an axis 25 (e.g., a centerline).

The lift assembly 14 includes one or more beams, articulated arms, bars, booms, arms, support members, boom sections, cantilever beams, etc., shown as lift arms 32. The lift arms 32 are hingedly or rotatably coupled with each other at their ends. The lift arms 32 can be hingedly or rotatably coupled to facilitate articulation of the lift assembly 14 and raising/lowering of the platform assembly 16. The boom 10 includes a lower lift arm 32*a*, a central or medial lift arm 32*b*, and an upper lift arm 32*c*. The lower lift arm 32*a* is configured to hingedly or rotatably couple at one end with the base assembly 12 to facilitate lifting (e.g., elevation) of the platform assembly 16. The lower lift arm 32*a* is configured to hingedly or rotatably couple at an opposite end with the medial lift arm 32*b*. Likewise, the medial lift arm 32*b* is configured to hingedly or rotatably couple with the upper lift arm 32*c*. The upper lift arm 32*c* can be configured to hingedly interface/couple and/or telescope with an intermediate lift arm 32*d*. The upper lift arm 32*c* can be referred to as "the jib" of the electric boom 10. The intermediate lift arm 32*d* may extend into an inner volume of the upper lift arm 32*c* and extend and/or retract. The lower lift arm 32*a* and the medial lift arm 32*b* may be referred to as "the boom" of the overall boom 10 assembly. The intermediate lift arm 32*d* can be configured to couple (e.g., rotatably, hingedly, etc.), with the platform assembly 16 to facilitate levelling of the platform assembly 16.

The lift arms 32 are driven to hinge or rotate relative to each other by actuators 34 (e.g., electric linear actuators, linear electric arm actuators, hydraulic cylinders, etc.). The actuators 34 can be mounted between adjacent lift arms 32 to drive adjacent lift arms 32 to hinge or pivot (e.g., rotate some angular amount) relative to each other about pivot points 84. The actuators 34 can be mounted between adjacent lift arms 32 using any of a foot bracket, a flange bracket, a clevis bracket, a trunnion bracket, etc. The actuators 34 are configured to extend or retract (e.g., increase in overall length, or decrease in overall length) to facilitate pivoting adjacent lift arms 32 to pivot/hinge relative to each other, thereby articulating the lift arms 32 and raising or lowering the platform assembly 16.

The actuators 34 can be configured to extend (e.g., increase in length) to increase a value of an angle 75 formed between adjacent lift arms 32. The angle 75 can be defined between centerlines of adjacent lift arms 32 (e.g., centerlines that extend substantially through a center of the lift arms 32). For example, the actuator 34*a* is configured to extend/retract to increase/decrease the angle 75*a* defined between a centerline of the lower lift arm 32*a* and the longitudinal axis 78 (angle 75*a* can also be defined between the centerline of the lower lift arm 32*a* and a plane defined by the longitudinal axis 78 and lateral axis 80) and facilitate lifting of the platform assembly 16 (e.g., moving platform assembly 16 at least partially along the upward direction 46). Likewise, the actuator 34*b* can be configured to retract to decrease the angle 75*a* to facilitate lowering of the platform assembly 16 (e.g., moving platform assembly 16 at least partially along the downward direction 48). Similarly, the actuator 34*b* is configured to extend to increase the angle 75*b* defined between centerlines of the lower lift arm 32*a* and the medial lift arm 32*b* and facilitate elevating of the platform assembly 16. Similarly, the actuator 34*b* is configured to retract to decrease the angle 75*b* to facilitate lowering of the platform assembly 16. The electric actuator 34*c* is similarly configured to extend/retract to increase/decrease the angle 75*c*, respectively, to raise/lower the platform assembly 16.

The actuators 34 can be mounted (e.g., rotatably coupled, pivotally coupled, etc.) to adjacent lift arms 32 at mounts 40 (e.g., mounting members, mounting portions, attachment members, attachment portions, etc.). The mounts 40 can be positioned at any position along a length of each lift arm 32. For example, the mounts 40 can be positioned at a midpoint of each lift arm 32, and a lower end of each lift arm 32.

The intermediate lift arm 32*d* and the frame 24 are configured to pivotally interface/couple at a platform rotator 30 (e.g., a rotary actuator, a rotational electric actuator, a gear box, etc.). The platform rotator 30 facilitates rotation of the platform assembly 16 about the axis 28 relative to the intermediate lift arm 32*d*. In some embodiments, the platform rotator 30 is between the frame 24 and the upper lift arm 32*c* and facilitates pivoting of the platform assembly 16 relative to the upper lift arm 32*c*. The axis 28 extends through a central pivot point of the platform rotator 30. The intermediate lift arm 32*d* is also configured to extend/retract along the upper lift arm 32*c*. The intermediate lift arm 32*d* can also be configured to pivotally/rotatably couple with the upper lift arm 32*c* such that the intermediate lift arm 32*d* pivots/rotates about the axis 25. The intermediate lift arm 32*d* can be driven to rotate/pivot about axis 25 by extension and retraction of the actuator 34*d*.

The platform assembly 16 is configured to be driven to pivot about the axis 28 (e.g., rotate about axis 28 in either a clockwise or a counter-clockwise direction) by an electric or hydraulic motor 26 (e.g., a rotary electric actuator, a stepper motor, a platform rotator, a platform electric motor, an electric platform rotator motor, etc.). The motor 26 can be configured to drive the frame 24 to pivot about the axis 28 relative to the upper lift arm 32*c* (or relative to the intermediate lift arm 32*d*). The motor 26 can be configured to drive a gear train to pivot the platform assembly 16 about the axis 28.

The lift assembly 14 is configured to pivotally or rotatably couple with the base assembly 12. The base assembly 12 include a rotatable base member, a rotatable platform member, a fully electric turntable, etc., shown as a turntable 70. The lift assembly 14 is configured to rotatably/pivotally couple with the base assembly 12. The turntable 70 is rotatably coupled with a base, frame, structural support member, carriage, etc., of base assembly 12, shown as the base 36. The turntable 70 is configured to rotate or pivot relative to the base 36. The turntable 70 can pivot/rotate about the central axis 42 relative to base 36, about a slew bearing 71. The turntable 70 facilitates accessing various elevated and angularly offset locations at the platform assembly 16. The turntable 70 is configured to be driven to rotate or pivot relative to base 36 and about the slew bearing 71 by an electric motor, an electric turntable motor, an electric rotary actuator, etc., shown as the turntable motor 44. The turntable motor 44 can be configured to drive a geared outer surface 73 of the slew bearing 71 that is rotatably coupled with base 36 about the slew bearing 71 to rotate the turntable 70 relative to the base 36. The lower lift arm 32*a* is pivotally coupled with the turntable 70 (or with a turntable member 72 of the turntable 70) such that the lift assembly 14 and the platform assembly 16 rotate as the turntable 70 rotates about the central axis 42. In some embodiments, the turntable 70 is configured to rotate a complete 360 degrees about the central axis 42 relative to the base 36. In other embodiments, the turntable 70 is configured to rotate an angular amount less than 360 degrees about the central axis 42 relative to the base 36 (e.g., 270 degrees, 120 degrees, etc.).

The base assembly 12 includes one or more energy storage devices (e.g., capacitors, batteries, Lithium-Ion batteries, Nickel Cadmium batteries, fuel tanks, etc.), shown as batteries 64. The batteries 64 are configured to store energy in a form (e.g., in the form of chemical energy) that can be converted into electrical energy for the various electric motors and actuators of the boom 10. The batteries 64 can be stored within the base 36. The boom 10 includes a controller 38 that is configured to operate any of the motors, actuators, etc., of the boom 10. The controller 38 can be configured to receive sensory input information from various sensors of the boom 10, user inputs from the HMI 20 (or any other user input device such as a key-start or a push-button start), etc. The controller 38 can be configured to generate control signals for the various motors, actuators, etc., of the boom 10 to operate any of the motors, actuators, electrically powered movers, etc., of the boom 10. The batteries 64 are configured to power any of the motors, sensors, actuators, electric linear actuators, electrical devices, electrical movers, stepper motors, etc., of the boom 10. The base assembly 12 can include a power circuit including any necessary transformers, resistors, transistors, thermistors, capacitors, etc., to provide appropriate power (e.g., electrical energy with appropriate current and/or appropriate voltage) to any of the motors, electric actuators, sensors, electrical devices, etc., of the boom 10.

The batteries 64 are configured to deliver power to the motors 52 to drive the tractive elements 82. A rear set of tractive elements 82 can be configured to pivot to steer the boom 10. In other embodiments, a front set of tractive elements 82 are configured to pivot to steer the boom 10. In still other embodiments, both the front and the rear set of tractive elements 82 are configured to pivot (e.g., independently) to steer the boom 10. In some examples, the base assembly 12 includes a steering system 150. The steering system 150 is configured to drive tractive elements 82 to pivot for a turn of the boom 10. The steering system 150 can be configured to pivot the tractive elements 82 in pairs (e.g., to pivot a front pair of tractive elements 82), or can be configured to pivot tractive elements 82 independently (e.g., four-wheel steering for tight-turns).

In some examples, the base assembly 12 also includes an HMI 21 (e.g., a user interface, a user input device, a display screen, etc.). In some embodiments, the HMI 21 is coupled with the base 36. In other embodiments, the HMI 21 is positioned on the turntable 70. The HMI 21 can be positioned on any side or surface of the base assembly 12 (e.g., on the front 62 of the base 36, on the rear 60 of the base 36, etc.)

Figure 2:
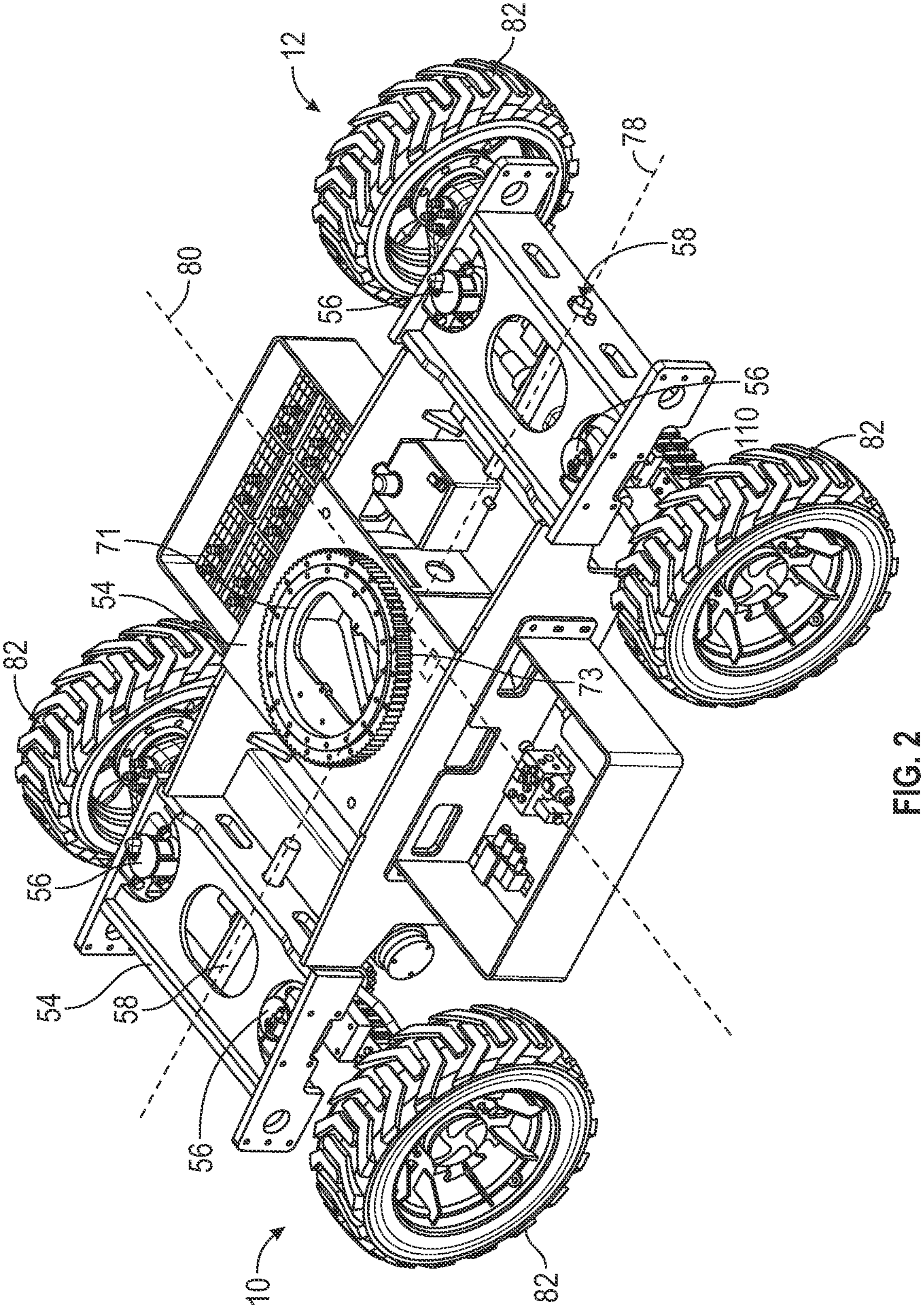
FIG. 2 is a top perspective view of a base assembly of the boom lift, with a turntable removed.
Figure 3:
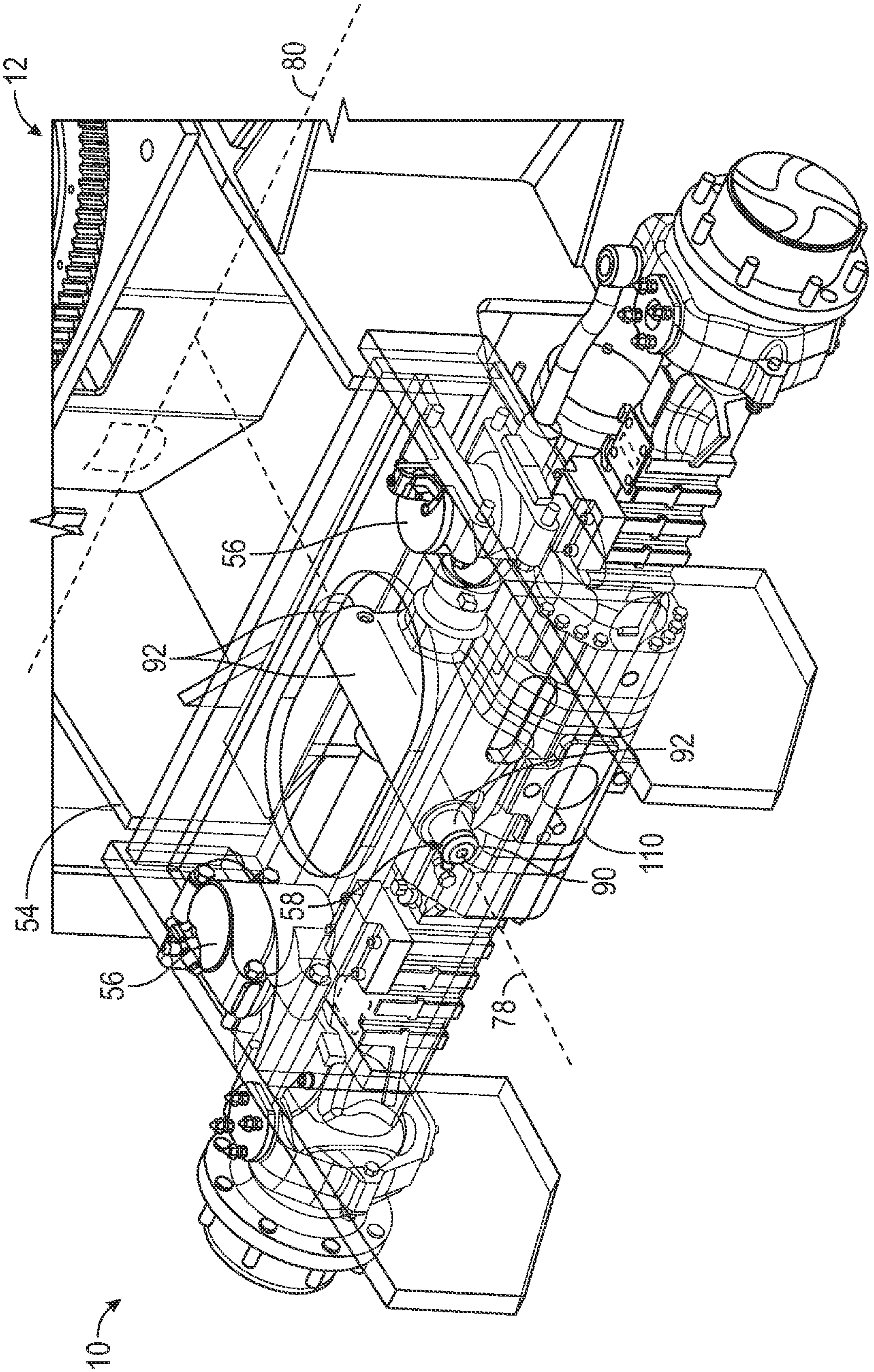
FIG. 3 is a top perspective view of a portion of the base assembly of FIG. 2.

Referring now to FIGS. 2-3, the base assembly 12 includes a longitudinally extending frame member 54 (e.g., a rigid member, a structural support member, an axle, a base, a frame, a carriage, etc.). The longitudinally extending frame member 54 provides structural support for the turntable 70 as well as the tractive elements 82. The longitudinally extending frame member 54 is pivotally coupled with lateral frame members 110 (e.g., axles, frame members, beams, bars, etc.) at opposite longitudinal ends of the longitudinally extending frame member 54. For example, the lateral frame members 110 may be pivotally coupled with the longitudinally extending frame member 54 at a front end and a rear end of the longitudinally extending frame member 54. The lateral frame members 110 can be configured to pivot about a pivot joint 58. The pivot joint 58 can include a pin 90 and a receiving portion 92 (e.g., a bore, an aperture, etc.). The pin 90 of the pivot joint 58 is coupled to one of the lateral frame member 110 (e.g., a front lateral frame member 110 or a rear lateral frame member 110) or the longitudinally extending frame member 54 and the receiving portion 92 is coupled to the other of the longitudinally extending frame member 54 and the lateral frame member 110. For example, the pin 90 may be coupled with longitudinally extending frame member 54 and the receiving portion 92 can be coupled with one of the lateral frame members 110 (e.g., integrally formed with the front lateral frame member 110).

In some embodiments, the longitudinally extending frame member 54 and the lateral frame members 110 are integrally formed or coupled (e.g., fastened, welded, riveted, etc.) to define the base 36. In still other embodiments, the base 36 is integrally formed with the longitudinally extending frame member 54 and/or the lateral frame members 110. In still other embodiments, the base 36 is coupled with the longitudinally extending frame member 54 and/or the lateral frame members 110.

The base assembly 12 includes one or more axle actuators 56 (e.g., electric linear actuators, electric axle actuators, electric levelling actuators, hydraulic cylinders, etc.). The axle actuators 56 can be linear actuators configured to receive power from the batteries 64, for example. The axle actuators 56 can be configured to extend or retract to contact a top surface of a corresponding one of the lateral frame members 110. When the axle actuators 56 extend, an end of a rod of the levelling actuators can contact the surface of lateral frame member 110 and prevent relative rotation between lateral frame member 110 and longitudinally extending frame member 54. In this way, the relative rotation/pivoting between the lateral frame member 110 and the longitudinally extending frame member 54 can be locked (e.g., to prevent rolling of the longitudinally extending frame member 54 relative to the lateral frame members 110 during operation of the lift assembly 14). The axle actuators 56 can receive power from the batteries 64, which can allow the axle actuators 56 to extend or retract. The axle actuators 56 receive control signals from controller 38.

Referring now to FIGS. 1 and 4-6, the boom 10 can include a turntable leveling system 170. The turntable leveling system 170 is configured to sit upon or above the slew bearing 71 and rotate with the turntable 70 to adjust a position of the lift assembly 14 relative to the base assembly 12. The turntable leveling system 170 is configured to adjust a tilt angle of the lift assembly 14 relative to the base assembly 12 and relative to the ground surface below. By adjusting the tilt angle relative to the base assembly 12, the turntable leveling system 170 can effectively maneuver the lift assembly 14 to control the magnitude and direction of the moment produced by the lift assembly 14. As explained below, tilting the turntable leveling system 170 can allow the boom 10 to maintain the deck 18 in an approximately parallel orientation relative to the ground surface below. The turntable leveling system 170 can also help to move the center of gravity of the boom 10 inward, toward a center of the base assembly 12 to reduce a tipping moment generated by the deck 18 and lift assembly 14.

Figure 6:
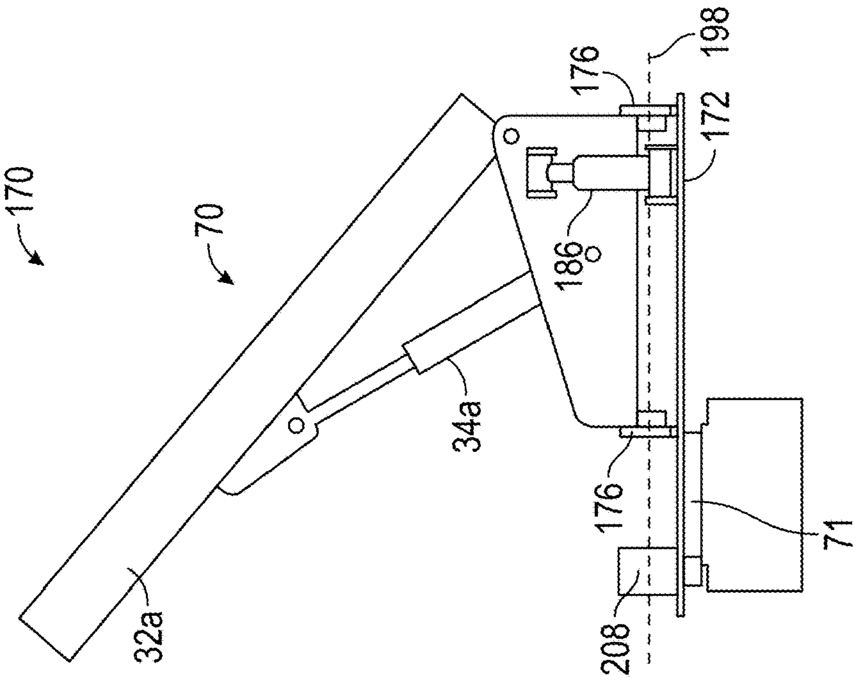
FIG. 6 is a side view of the turntable leveling system of FIG. 4.
Figure 5:
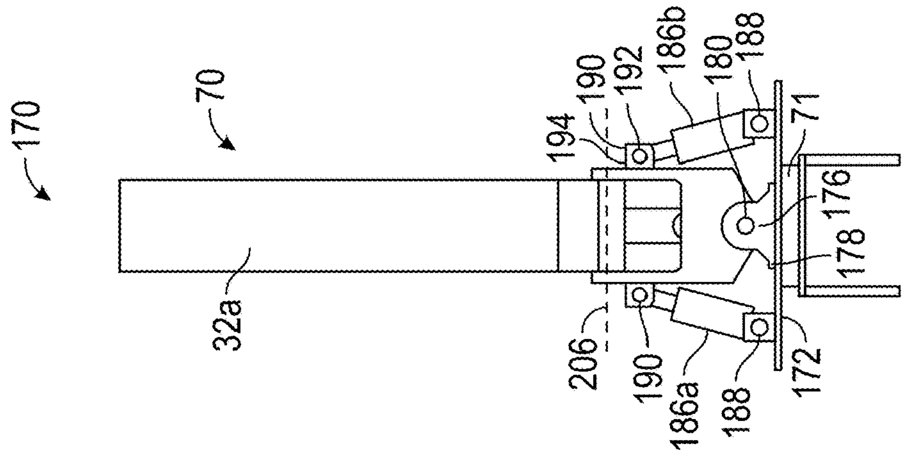
FIG. 5 is a front view of the turntable leveling system of FIG. 4.
Figure 4:
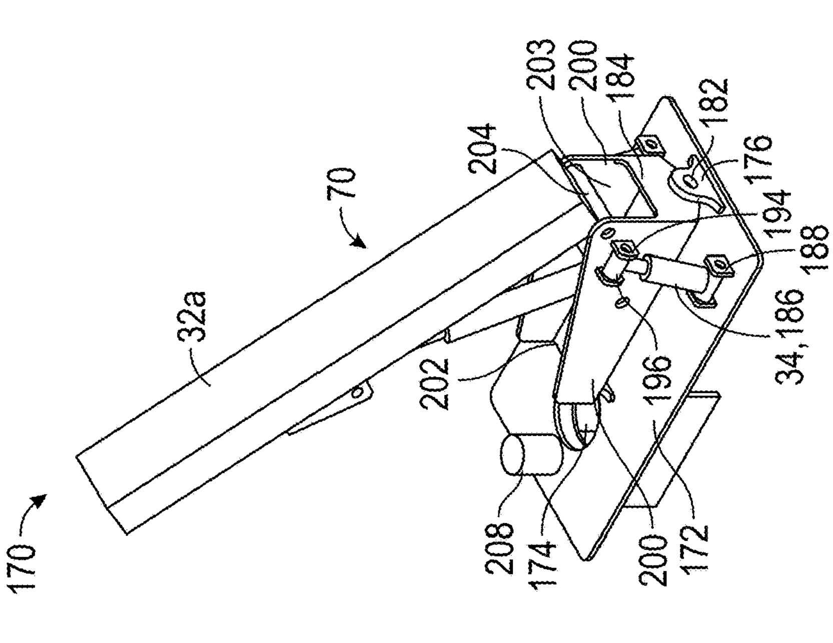
FIG. 4 is a top perspective view of a turntable leveling system that can be incorporated into the boom lift of FIG. 1.

Referring now to FIGS. 4-6, the turntable leveling system 170 is depicted. The turntable leveling system 170 generally includes a base, shown as baseplate 172 that receives and supports a series of actuators (e.g., hydraulic cylinders) that are configured to adjust a position of the lift assembly 14 relative to the baseplate 172. The baseplate 172 is configured to rest upon or be supported by the slew bearing 71. As depicted in FIG. 4, the baseplate defines a passage, shown as a hole 174, that is aligned with a central passage of the slew bearing 71 (see FIG. 2). The baseplate 172 can be rigidly or removably secured to the slew bearing 71, so that rotation of the slew bearing 71 (e.g., by driving the turntable motor 44) will simultaneously rotate the baseplate 172 and turntable 70, as a whole. The baseplate 172 can be considered the turntable 70 in some embodiments.

The turntable leveling system 170 is configured to adjust a position of the lower lift arm 32*a* about two separate and perpendicular axes using three actuators 34. As depicted in FIG. 4, the baseplate 172 includes two lugs 176 extending upward from the baseplate 172. In some examples, the lugs 176 are rigidly coupled (e.g., welded) to the baseplate to provide a solid and continuous structure. The lugs 176 each include a widened mounting section 178 and an eyelet 180. The eyelet 180 defines a hole that can receive and support a pivot pin 182. The pivot pin 182 extends through the eyelet 180 and into a bracket 184 to couple the bracket 184 to the baseplate 172. As explained in additional detail below, the bracket 184 receives and supports the lower lift arm 32*a*, which rotates relative to the bracket 184 to raise and lower the platform assembly 16.

The baseplate 172 further supports bracket tilting actuators, shown as hydraulic cylinders 186. The hydraulic cylinders 186 are pivotally coupled to the baseplate 172 using a pin-mounted connection. As depicted in FIG. 4, second and third sets of lugs 188 are configured to receive and support a first end of each of the hydraulic cylinders 186. The hydraulic cylinders 186 angle upwardly and inwardly away from the lugs 188 toward a pivotal coupling 190 formed on either lateral side of the bracket 184. The pivotal coupling 190 can once again be in the form of lugs 192 that receive a pin 194. In some examples, the pin 194 extends through a sleeve 196 formed on a rod of the hydraulic cylinder 186. Accordingly, extension or retraction of the hydraulic cylinder 186 pushes or pulls the bracket 184, which adjusts the orientation of the bracket 184 and lower lift arm 32*a* relative to the baseplate 172 and relative to the base assembly 12 of the boom 10.

The bracket 184 is configured to pivot about an axis 198 that is defined by the lugs 176. The hydraulic cylinders 186 are in communication with the controller 38 to orient the bracket 184 relative to the baseplate 172 and relative to the base assembly 12. As depicted in FIG. 5, each of the two hydraulic cylinders 186 are configured to rotate the bracket 184 to a desired angular position about the axis 198. To tilt the bracket 184 about the lugs 176, one of the hydraulic cylinders 186*a* extends while the other hydraulic cylinder 186*b* retracts. Because of the rotatable coupling formed between each of the hydraulic cylinders 186*a*, 186*b* and the bracket 184, simultaneous extension and retraction of the hydraulic cylinders 186*a*, 186*b* allows the bracket 184 to rotate over an angle of about 10 degrees or more. For example, the hydraulic cylinders 186 can together rotate the bracket 184 about 5 degrees in each direction (e.g., clockwise and counterclockwise) about the axis 198. The range of rotation can be adjusted by moving the hydraulic cylinders 186*a*, 186*b* laterally relative to the lugs 176. For example, moving the hydraulic cylinders 186*a*, 186*b* laterally outward, away from the lugs 176 will create a larger sweep angle for the bracket 184 to travel through (e.g., 15 degrees, 20 degrees, etc.) Moving the hydraulic cylinders 186*a*, 186*b* laterally inward, toward the lugs 176 will reduce the sweep angle for the bracket 184 to travel through (e.g., 8 degrees, 6 degrees, 4 degrees, etc.)

Rotating the bracket 184 about the lugs 176 rotates the turntable 70 and lower lift arm 32*a* relative to the baseplate 172, which in turn rotates the platform assembly 16 relative to the base assembly 12. As depicted in FIGS. 4-6, the bracket 184 has a U-shaped cross-section that is defined by side plates 200 and an actuator plate 202 that extend along a length of the bracket 184. The side plates 200 and the actuator plate 202 together define an internal pocket 203 that can receive and support the lower lift arm 32*a*, as well as the actuator 34*a*. The actuator 34*a* is pivotally coupled to the actuator plate 202, and is configured to adjust an angle of the lower lift arm 32*a* relative to the actuator plate 202 by extending or retracting. Extension and retraction of the actuator 34*a* raises and lowers the lower lift arm 32*a*, which rotates about the pin joint 204. The pin joint 204 can be used to couple the lower lift arm 32*a* to the side plates 200 of the bracket 184. As depicted in FIG. 4, the pin joint 204 defines a second axis 206 that is perpendicular to the axis 198 that is defined by the lugs 176. The baseplate 172 can further include a stop 208 that extends upwardly from the baseplate 172. When in a fully retracted position, the lower lift arm 32*a* can rest upon the stop 208. In some examples, the stop 208 is a housing for the turntable motor 44.

The turntable leveling system 170 can be used to adjust an angle of the turntable 70 relative to the base assembly 12, which in turn adjusts the moment arm created by the overall lift assembly 14 during operation. As indicated, the boom 10 may encounter uneven terrain during outdoor use. The turntable leveling system 170 is adapted to combat uneven terrain by adjusting the turntable 70 and lift assembly 14, generally, relative to the base assembly 12 of the boom 10. Rotating the turntable 70 about a single degree of freedom (e.g., about the axis 198) allows for a less complex, yet effective method of managing the tipping moment produced by the lift assembly 14 and platform assembly 16 when the base assembly 12 is tilted. Similarly, with the rotation of the turntable 70 about the slew bearing 71, multi-directional adjustment can be accomplished.

Figure 9:
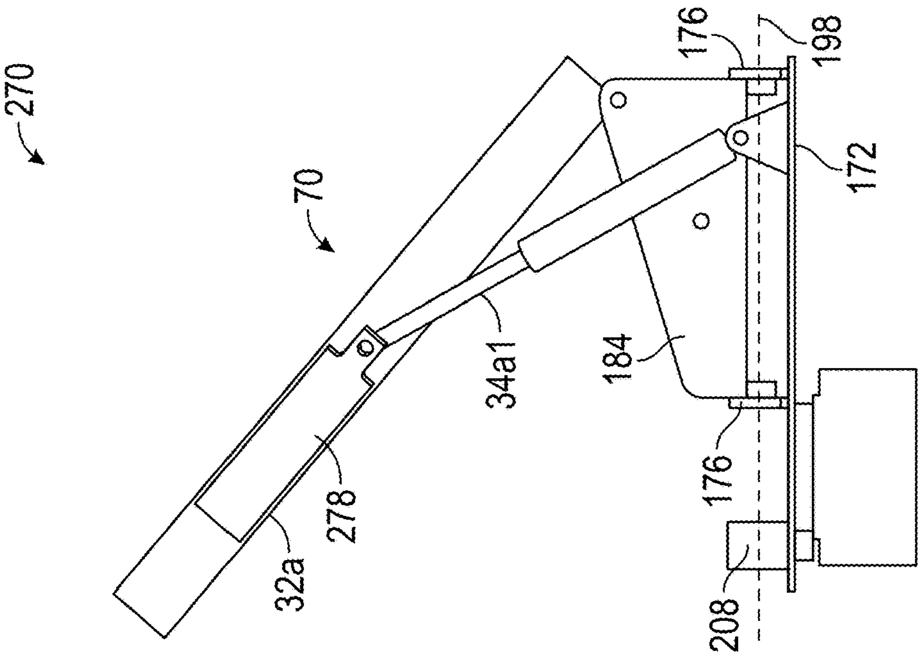
FIG. 9 is a side view of the turntable leveling system of FIG. 7.
Figure 8:
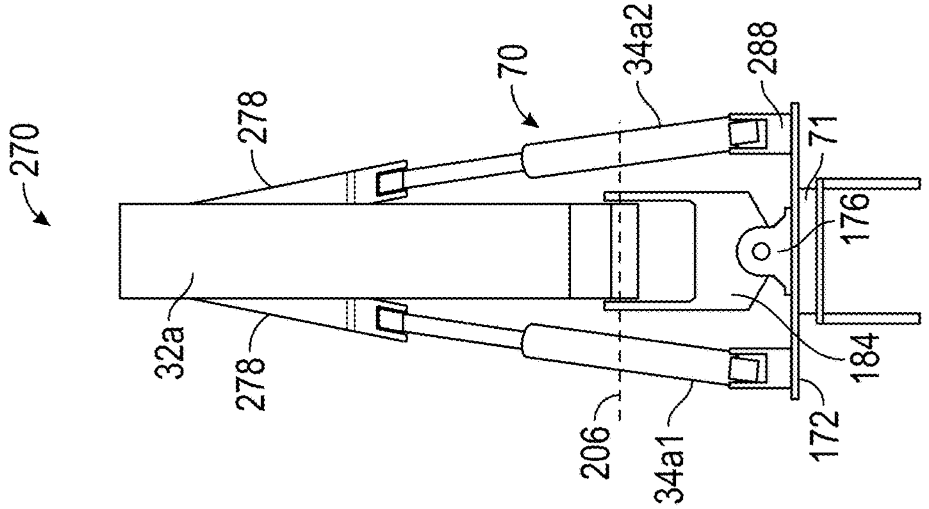
FIG. 8 is a front view of the turntable leveling system of FIG. 7.
Figure 7:
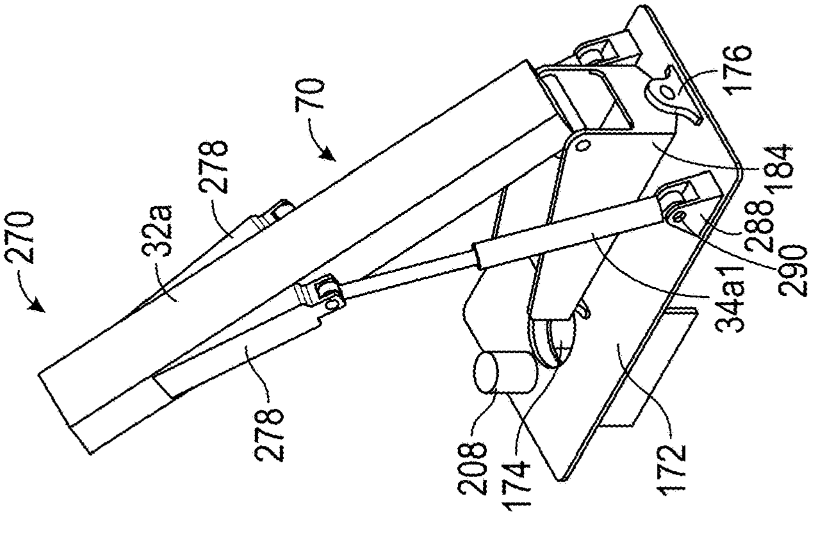
FIG. 7 is a top perspective view of another turntable leveling system that can be incorporated into the boom lift of FIG. 1.

Referring now to FIGS. 7-9, another exemplary turntable leveling system 270 is depicted. The turntable leveling system 270, like the turntable leveling system 170, includes the baseplate 172 that receives and supports a series of actuators that are configured to adjust the position of the lift assembly 14 relative to the baseplate 172. The baseplate 172 once again rests upon and is supported by the slew bearing 71. The baseplate 172 can be rigidly or removably secured to the slew bearing 71 so that rotation of the slew bearing 71 will rotate the baseplate 172 and turntable 70 in unison.

The turntable leveling system 270 is also configured to adjust a position of the lower lift arm 32*a* about two separate and perpendicular axes using two actuators 34. The actuators 34*a*1, 34*a*2 function as both tilt actuators and lift actuators to adjust the height and angle of the lower lift arm 32*a* relative to the baseplate 172 using the bracket 184. The actuators 34*a*1, 34*a*2 are each rotatably and pivotably coupled to the baseplate 172 using lugs 288 that extend upwardly away from the baseplate 172. The lugs 288 are configured to receive a pivot pin 290 that can removably secure an end of the actuators 34*a*1, 34*a*2 to the baseplate 172. The opposite ends of the actuators 34*a*1, 34*a*2 are pivotally coupled (e.g., using a spherical bearing) to wings 278 formed on the lower lift arm 32*a*. The wings 278 angle outwardly and downwardly away from the lower lift arm 32*a* to define actuator attachment points on either side of the lower lift arm 32*a*. Extension or retraction of the actuators 34*a*1, 34*a*2 can be used to rotate the lower lift arm 32*a* upward or downward relative to the bracket 184 (e.g., about the pin joint 204) or tilt the bracket 184 relative to the baseplate 172 about the lugs 176. The actuators **34*a*1, 34*a*2 are each pivotally coupled to the wings 278 so that the lower lift arm 32*a* can move relative to the actuators 34*a*1, 34*a*2 about at least two different axes. Extending or retracting the actuators 34*a*1, 34*a*2 at identical rates will rotate the lower lift arm 32*a* upward or downward about the axis 206, while extending or retracting the actuators 34*a*1, 34*a*2 at different rates will tilt the lower lift arm 32*a* and bracket 184 about the axis 198. Accordingly, the actuators 34*a*1, 34*a*2 can raise, lower, and tilt the lower lift arm 32*a* and lift assembly 14 relative to the baseplate 172 about both axes 198, 206 using the bracket 184**.

Figure 10:
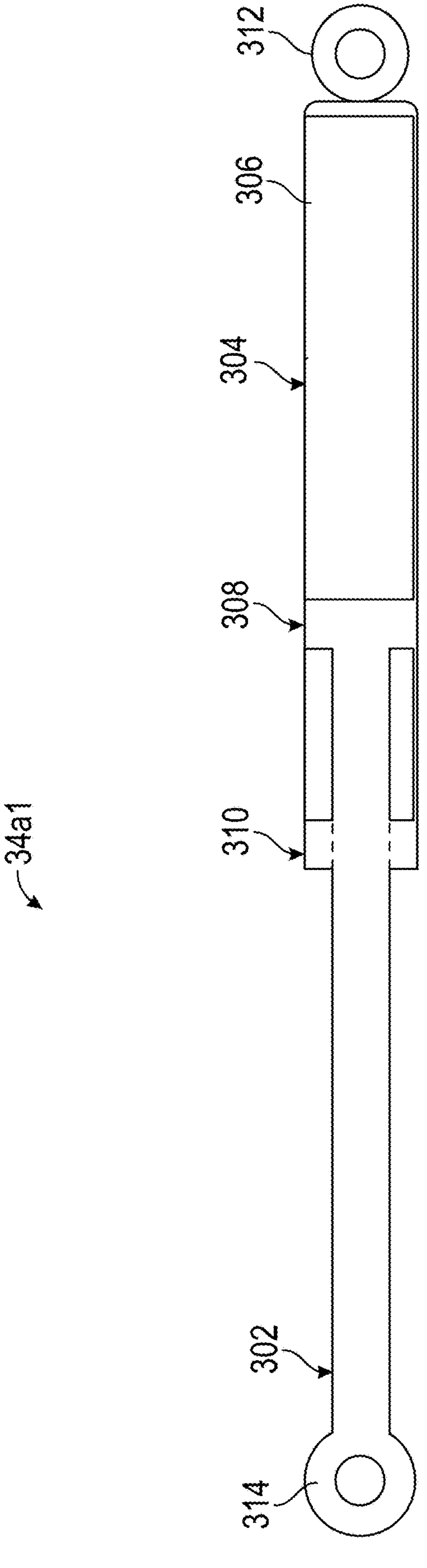
FIG. 10 is a schematic view of a hydraulic cylinder that can be incorporated into the turntable leveling system of FIG. 7.

FIG. 10 depicts an exemplary actuator **34*a*1, 34*a*2 that can be used in the turntable leveling system 270. The actuator 34*a*1, 34*a*2 generally includes a lift rod 302 that is movable within a cylinder housing 304. The lift rod 302 is movable relative to the cylinder housing 304 by adding or removing hydraulic fluid to or from a pressure chamber 306. The lift rod 302 includes a piston 308 that moves in response to the addition or subtraction of hydraulic fluid into the pressure chamber 306. A head gland 310 defines an aperture through which the lift rod 302 can slide in response to a change in fluid level within the pressure chamber 306. As depicted in FIG. 10, each of the cylinder housing 304 and the lift rod 302 can include eyelets 312, 314 that can be used to couple the cylinder to the lugs 288 and wings 278** respectively.

Figure 11:
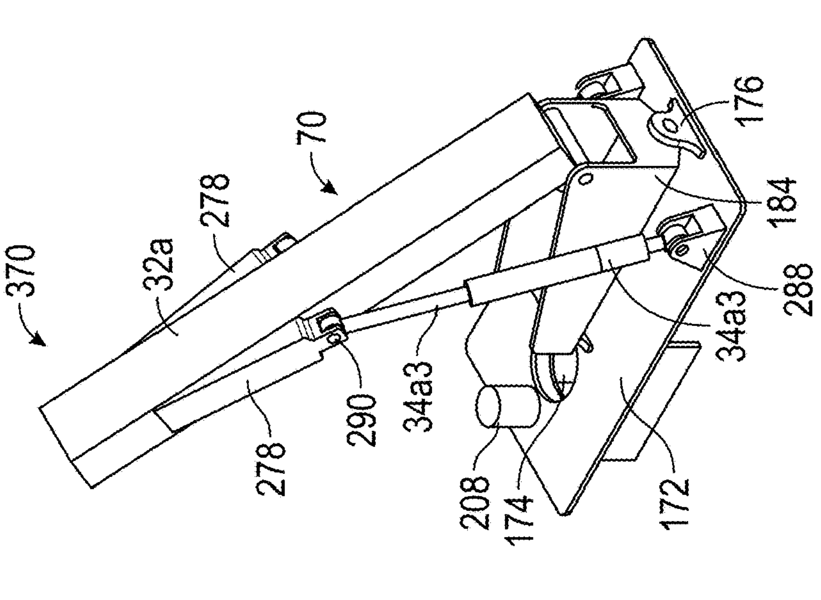
FIG. 11 is a top perspective view of another turntable leveling system that can be incorporated into the boom lift of FIG. 1.
Figure 12:
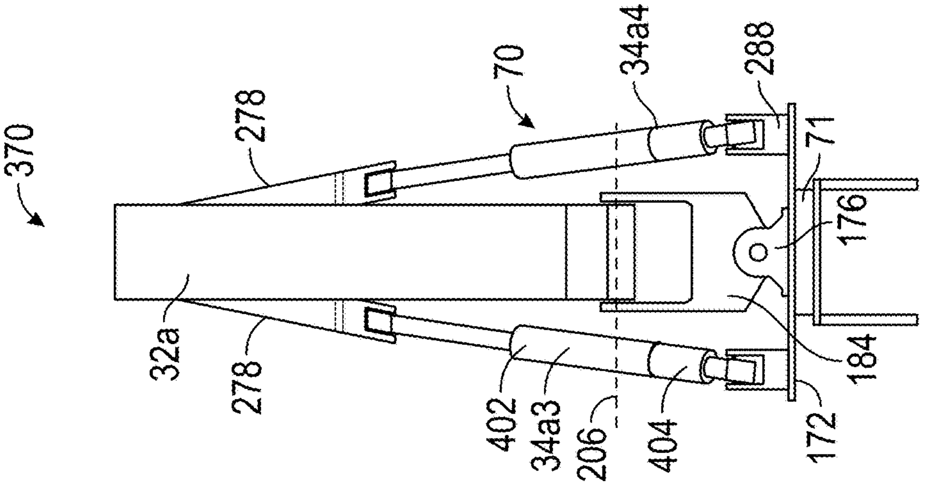
FIG. 12 is a front view of the turntable leveling system of FIG. 11.
Figure 13:
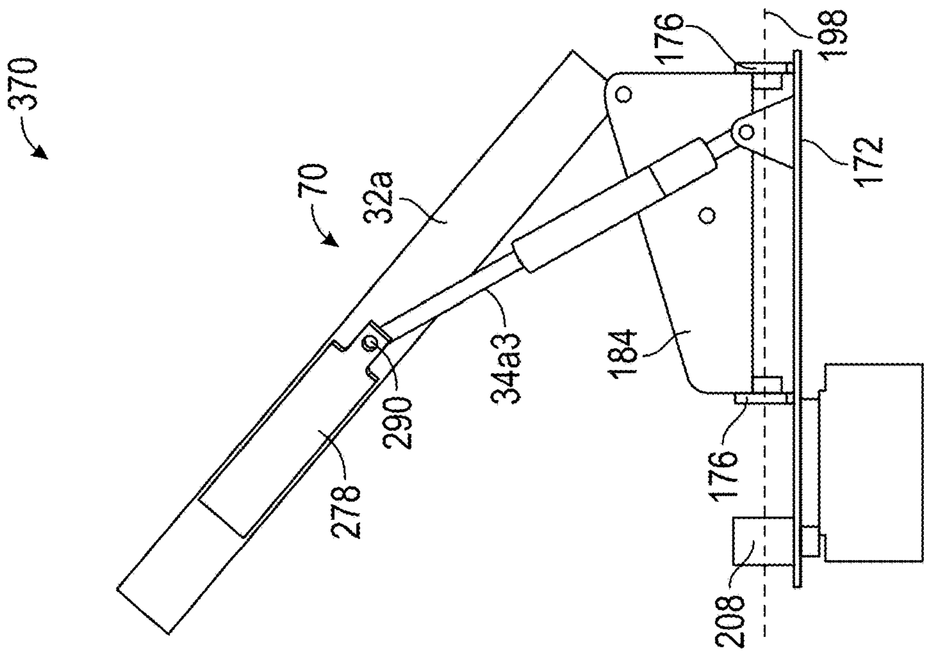
FIG. 13 is a side view of the turntable leveling system of FIG. 11.

Referring now to FIGS. 11-13, another exemplary turntable leveling system 370 is depicted. The turntable leveling system 370, like the turntable leveling systems 170, 270, generally includes a baseplate 172 and a bracket 184 that is rotatable relative to the baseplate 172 to adjust a tilt angle of the bracket 184 and lower lift arm **32*a*. The baseplate 172 is positioned above the slew bearing 71 and configured to rotate with the turntable 70 about the slew bearing 71**.

The turntable leveling system 370 is arranged similar to the turntable leveling system 270, having two separate hydraulic actuators **34*a*3, 34*a*4 that are configured to adjust the height and angle of the lower lift arm 32*a* about two separate and orthogonal axes 198, 206 relative to the baseplate 172. The actuators 34*a*3, 34*a*4 are again rotatably and pivotably coupled to the baseplate 172 using lugs 288 that extend upwardly away from the baseplate 172. The pivot pins 290 can once again be used to couple the actuators 34*a*3, 34*a*4 to the wings 278 formed on the lower lift arm 32*a*. Extension or retraction of the actuators 34*a*3, 34*a*4 can be used to rotate the lower lift arm 32*a* upward or downward relative to the bracket 184 about the pin joint 204 and can also tilt the bracket 184 relative to the baseplate 172 about the lugs 176. The actuators 34*a*3, 34*a*4 are each pivotally coupled to the wings 278 and the lugs 288 using spherical bearings and/or pin couplings that allow the actuators 34*a*3, 34*a*4 to move relative to the lower lift arm 32*a* about at least two axes. Extending or retracting the actuators 34*a*3, 34*a*4 at identical rates will rotate the lower lift arm 32*a* upward or downward about the axis 206, while extending or retracting the actuators 34*a*1, 34*a*2 at different rates will tilt the lower lift arm 32*a* and bracket 184 about the axis 198. Accordingly, the actuators 34*a*3, 34*a*4 can raise, lower, and tilt the lower lift arm 32*a* and lift assembly 14 relative to the baseplate 172 about both axes 198, 206 using the bracket 184**.

Figure 14:
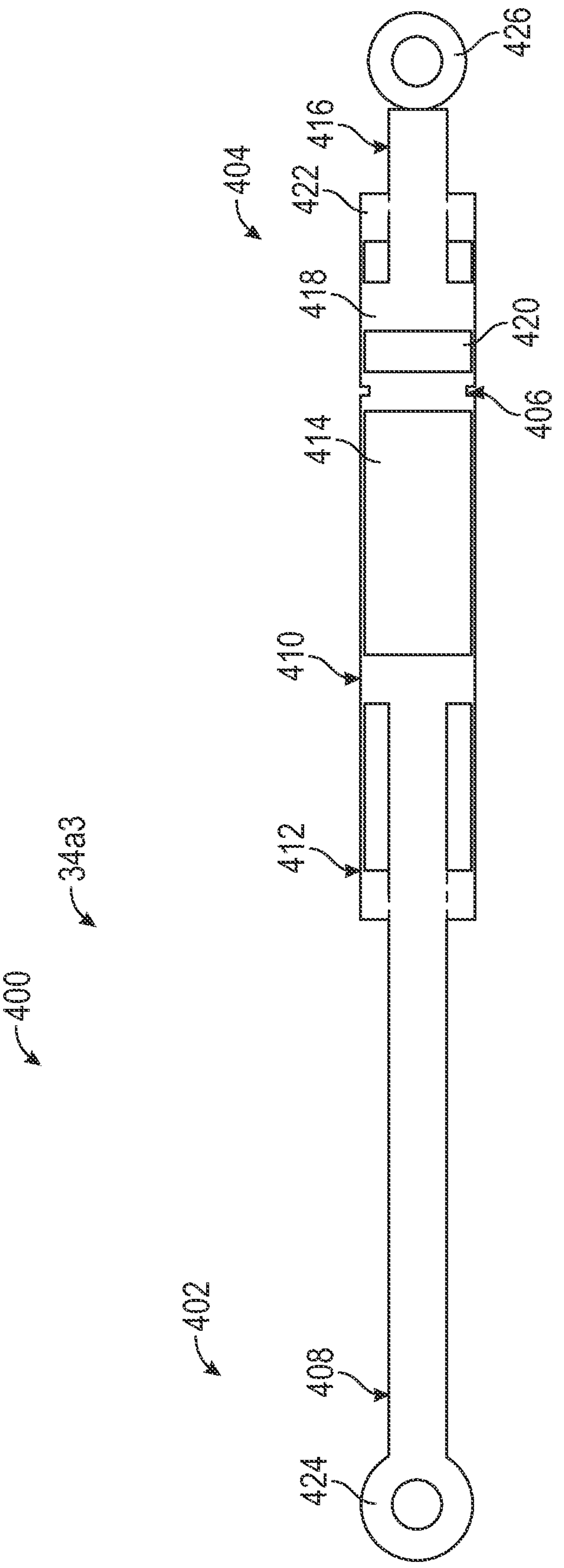
FIG. 14 is a schematic view of a hydraulic cylinder that can be incorporated into the turntable leveling system of FIG. 11.

The lift actuators **34*a*3, 34*a*4 are two-stage actuators 400. With additional reference to FIG. 14, the lift actuators 34*a*3, 34*a*4 are formed as two stage actuators 400 having a lift segment 402 and a tilt segment 404. The lift segment 402 and the tilt segment 404 are divided by an end cap 406. The lift segment 402 includes a lift rod 408 having a piston 410 that is movable within the lift segment 402. The lift rod 408 moves relative to a lift head gland 412 in response to a change in volume of hydraulic fluid within a fluid chamber 414 of the lift segment. When hydraulic fluid is introduced into the fluid chamber 414, the piston 410 moves outward, and the lift rod 408 extends outward. When hydraulic fluid is drained from the fluid chamber 414, the piston 410 moves inward, toward the end cap 406, which retracts the lift rod 408. The tilt segment includes a tilt rod 416 that includes a second piston 418 that is movable within the tilt segment 404. The tilt rod 416 moves inward or outward in response to a volume of fluid present within a second chamber 420. A tilt head gland 422 defines an opening through which the tilt rod 416 moves. As depicted in FIG. 14, an eyelet 424, 426 can be included on each of the lift rod 408 and the tilt rod 416 to allow the actuators 400 to be coupled with the wings 278 and lugs 288**, respectively.

Using the two-stage actuators 400 allows for dedicated lifting and tilting functions to be accomplished. In some examples, each of the lift segments 402 on the actuators **34*a*3, 34*a*4 can be used to raise or lower the lower lift arm 32*a* relative to the baseplate 172. The tilt function can be performed by extending or retracting just the tilt rods 416. Similarly, the lifting function can be performed by extending or retracting just the lift rods 408, while allowing the tilt rods 416 to remain stationary. The lifting function and tilting functions can be executed simultaneously by adjusting the fluid level in each of the chambers 414, 420. In some examples, the two-stage design of the actuators 400 also provides dampening to the system as the boom 10** moves.

Figure 15:
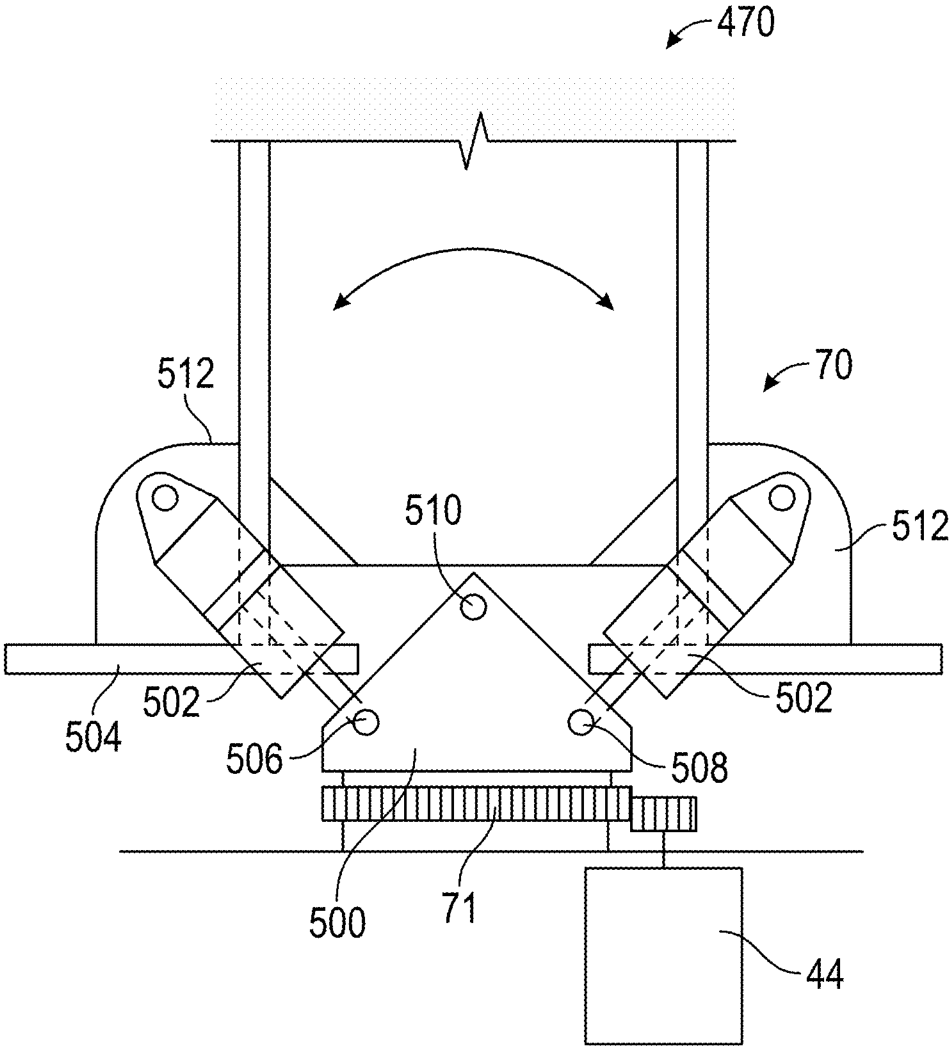
FIG. 15 is a front view of another turntable leveling system that can be incorporated into the boom lift of FIG. 1.

Referring now to FIG. 15, still another exemplary turntable leveling system 470 is depicted. The turntable leveling system 470 generally includes a bracket 500, two tilt actuators 502, and a baseplate 504 that is configured to tilt in response to movement by either of the actuators 502. The bracket 500 is defined by a generally triangular shape that includes three pivot points 506, 508, 510 that support and rotatably receive each of the actuators 502 and the baseplate 504. As depicted in FIG. 15, the bracket 500 is positioned above the slew bearing 71 and is configured to rotate in response to rotation of the turntable 70 about the slew bearing 71 (e.g., by the turntable motor 44).

The baseplate 504 and turntable 70, generally, are configured to tilt about an axis defined by the pivot point 510 at the apex of the bracket 500 in response to extension or retraction of the actuators 502. In some examples, flanges 512 extend upwardly from the baseplate 504 to receive and secure an end of the tilt actuators 502, which are shown as hydraulic cylinders. The tilt actuators 502 are rotatably coupled to the flanges 512 at one end and rotatably coupled to the pivot points 506, 508 at the opposite end. Extension or retraction of the actuators 502 rotates the baseplate 504 about the pivot point 510. The actuators 502 each angle outwardly away from the bracket 500, and are configured to rotate the baseplate 504 through a range of between 5 and 15 degrees. In some examples, the baseplate 504 can rotate about 10 degrees total, 5 degrees in each direction about the axis defined by the pivot point 510.

Using any of the above-referenced turntable leveling systems 170, 270, 370, 470, the turntable 70 of the boom 10 can be tilted to offset changes in terrain experienced by the boom 10. By including a rotatable bracket or baseplate that is movable with controllable tilt (and in some instances, lift) actuators, precise and accurate adjustments can be made to the lower lift arm **32*a* of the boom 10 that in turn adjust the positioning of the overall lift assembly 14. Adjusting the tilt angle of the turntable 70 can reduce or otherwise alter a tipping moment that is generated by uneven terrain, which can allow a worker on the platform assembly 16 to remain in an elevated position while moving the boom 10. By positioning the tilting/leveling mechanism above the slew bearing 71, fewer tilt actuators are needed to provide multi-axis control of the boom 10**.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the mobile elevating work platform as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A mobile elevating work platform, comprising:
- a chassis;
- a slew bearing supported by the chassis;
- a turntable positioned above the slew bearing and configured to rotate about the slew bearing;
- a lift system positioned on the turntable and configured to rotate with the turntable relative to the chassis about the slew bearing; and
- a turntable leveling system positioned above the slew bearing and supporting the lift system, the turntable leveling system comprising:
  - a baseplate extending above the slew bearing and defining the turntable;
  - a bracket rotatably coupled to the baseplate and configured to tilt relative to the baseplate about an axis extending parallel with the baseplate;
  - a first actuator and a second actuator, the first actuator positioned on a first side of the bracket and the second actuator positioned on a second side of the bracket;
  - wherein extension of the first actuator and retraction of the second actuator causes the bracket to rotate about the axis in a first direction; and
  - wherein retraction of the first actuator and extension of the second actuator causes the bracket to rotate about the axis in a second direction opposite the first direction.

2. The mobile elevating work platform of claim 1, wherein the lift system includes an articulating boom, and wherein a lower lift arm of the articulating boom is rotatably coupled to the bracket.

3. The mobile elevating work platform of claim 2, wherein a lift actuator is coupled to the bracket and is configured to rotate the lower lift arm about a second axis perpendicular to the axis.

4. The mobile elevating work platform of claim 1, wherein the first actuator and the second actuator are configured to adjust an orientation of the bracket relative to the baseplate and are further configured to adjust a height of the lift system.

5. The mobile elevating work platform of claim 4, wherein each of the first actuator and the second actuator include a lift cylinder and a tilt cylinder, wherein the tilt cylinder is configured to adjust the orientation of the bracket relative to the baseplate and the lift cylinder is configured to adjust the height of the lift system.

6. The mobile elevating work platform of claim 4, wherein the first actuator and the second actuator are coupled to the baseplate at a first end and coupled to a lower lift arm of the lift system at a second end.

7. The mobile elevating work platform of claim 6, wherein the lower lift arm includes laterally and rearwardly extending wings that define eyelets that receive the second ends of the first actuator and the second actuator.

8. The mobile elevating work platform of claim 1, wherein the lift system includes a platform assembly configured to be raised away from the chassis.

9. The mobile elevating work platform of claim 1, wherein the bracket is supported by lugs extending upwardly away from the baseplate, the lugs supporting a pivot pin about which the bracket is configured to rotate.

10. A mobile elevating work platform, comprising:
- a chassis;
- a slew bearing supported by the chassis;
- a turntable positioned above the slew bearing and configured to rotate about the slew bearing;
- a lift system positioned on the turntable and configured to rotate with the turntable relative to the chassis about the slew bearing; and
- a turntable leveling system positioned above the slew bearing and supporting the lift system, the turntable leveling system comprising:
  - a bracket defining an array of pivot points;
  - a baseplate coupled to the bracket and configured to rotate about an axis defined by at least one of the array of pivot points;
  - a first actuator and a second actuator, the first actuator positioned on a first side of the bracket and coupled to one of the array of pivot points and the second actuator positioned on a second side of the bracket and coupled to one of the array of pivot points;
  - wherein extension of the first actuator and retraction of the second actuator causes the baseplate to rotate about the axis in a first direction; and
  - wherein retraction of the first actuator and extension of the second actuator causes the baseplate to rotate about the axis in a second direction opposite the first direction.

11. The mobile elevating work platform of claim 10, wherein the lift system includes an articulating boom, and wherein a lower lift arm of the articulating boom is rotatably coupled to the baseplate.

12. The mobile elevating work platform of claim 10, wherein the first actuator and the second actuator angle outwardly away from the bracket at an angle of between 45 degrees and 160 degrees.

13. The mobile elevating work platform of claim 10, wherein the bracket has a generally triangular shape, and wherein the array of pivot points are positioned adjacent vertices of the generally triangular shape.

14. The mobile elevating work platform of claim 13, wherein the baseplate is coupled to the bracket adjacent an uppermost vertex of the bracket.

15. The mobile elevating work platform of claim 10, wherein the bracket is positioned between the baseplate and the slew bearing.

16. The mobile elevating work platform of claim 15, wherein flanges are formed on the baseplate, and wherein the each of the first actuator and the second actuator are coupled to one of the flanges.

17. A mobile elevating work platform, comprising:
- a chassis;
- a slew bearing supported by the chassis;
- a turntable positioned above the slew bearing and configured to rotate about the slew bearing;
- a lift system positioned on the turntable and configured to rotate with the turntable relative to the chassis about the slew bearing; and
- a turntable leveling system positioned above the slew bearing and supporting the lift system, the turntable leveling system comprising:
  - a baseplate extending above the slew bearing and defining the turntable;
  - a bracket rotatably coupled to the baseplate and configured to tilt relative to the baseplate about an axis extending parallel with the baseplate;
  - a first actuator and a second actuator, the first actuator positioned on a first side of the bracket and the second actuator positioned on a second side of the bracket, wherein the first actuator is coupled to a first side of a lower lift arm of the lift system and the second actuator is coupled to a second side of the lower lift arm of the lift system;
  - wherein extension of the first actuator and retraction of the second actuator causes the bracket to rotate about the axis in a first direction; and
  - wherein retraction of the first actuator and extension of the second actuator causes the bracket to rotate about the axis in a second direction opposite the first direction.

18. The mobile elevating work platform of claim 17, wherein extending of the first actuator and extension of the second actuator causes the lower lift arm of the lift system to rotate upwardly away from the bracket.

19. The mobile elevating work platform of claim 18, wherein retracting of the first actuator and retraction of the second actuator causes the lower lift arm of the lift system to rotate downwardly toward the bracket.

20. The mobile elevating work platform of claim 17, wherein each of the first actuator and the second actuator are two-stage actuators.

* * * * *